United States Patent
Kakuta

(10) Patent No.: US 8,336,662 B2
(45) Date of Patent: Dec. 25, 2012

(54) MOTORCYCLE

(75) Inventor: Wataru Kakuta, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 716 days.

(21) Appl. No.: 12/193,936

(22) Filed: Aug. 19, 2008

(65) Prior Publication Data

US 2009/0050392 A1     Feb. 26, 2009

(30) Foreign Application Priority Data

Aug. 24, 2007   (JP) ................................. 2007-219070

(51) Int. Cl.
*B60K 13/04*     (2006.01)
*B62J 23/00*     (2006.01)
(52) U.S. Cl. ........................................ 180/219; 180/309
(58) Field of Classification Search ................. 180/219, 180/225, 229, 68.3, 309, 296
See application file for complete search history.

(56) References Cited

U.S. PATENT DOCUMENTS

| | | | | |
|---|---|---|---|---|
| 4,799,569 A | * | 1/1989 | Hattori et al. | 180/219 |
| 2005/0017531 A1 | * | 1/2005 | Nagashii | 296/37.1 |
| 2007/0107968 A1 | * | 5/2007 | Iwanaga | 180/227 |
| 2008/0006463 A1 | * | 1/2008 | Oohashi | 180/219 |
| 2008/0060864 A1 | * | 3/2008 | Arai | 180/219 |

FOREIGN PATENT DOCUMENTS

| | | | |
|---|---|---|---|
| GB | 777 821 A | | 6/1957 |
| JP | 02-197483 | | 8/1990 |
| JP | 402197483 | * | 8/1990 |
| JP | 402197484 | * | 8/1990 |
| JP | 4-339086 A | | 11/1992 |
| JP | 2004-268734 A | | 9/2004 |

OTHER PUBLICATIONS

Official Communication issued in corresponding European Patent Application No. 08014940.4, completed on Oct. 14, 2010.

* cited by examiner

*Primary Examiner* — Anne Marie M Boehler
(74) *Attorney, Agent, or Firm* — Keating & Bennett, LLP

(57) ABSTRACT

An exhaust system for a motorcycle has a bent portion that extends upward from a position below a seat toward the seat and is then bent downward. A heat insulating plate is disposed in a space between the bent portion and the seat so as to cover the bent portion. Influence of exhaust heat on the rider and upsizing of the heat insulating plate are thereby suppressed.

13 Claims, 9 Drawing Sheets

MOTORCYCLE

RELATED APPLICATIONS

This application claims the benefit of priority under 35 USC 119 of Japanese patent application no. 2007-219070, filed on Aug. 24, 2007, which is hereby incorporated by reference.

BACKGROUND TO THE INVENTION

1. Field of the Invention

The present invention relates to a motorcycle having an exhaust system, and in particular, to an exhaust system extending rearward from an engine mounted on a body frame.

2. Description of Related Art

A motorcycle must have a sufficiently long exhaust pipe to increase engine output. Some conventional motorcycles of this type include an exhaust pipe connected with an engine and extended rearward below a fuel tank and a seat to ensure a required length of the exhaust pipe. JP-B-2771212 proposes a heat insulation structure, in which a heat insulating plate is disposed between the exhaust pipe, the fuel tank and the seat, in order to prevent the fuel tank and seat from overheating due to exhaust heat.

However, although the exhaust pipe extends rearward along the fuel tank and seat and is thus sufficiently long, covering this long exhaust pipe with a heat insulating plate throughout its length disadvantageously increases cost and weight.

SUMMARY OF THE INVENTION

The present invention is made in view of these circumstances and provides a motorcycle with a required length of exhaust pipe while avoiding additional cost and weight due to increased size of a heat insulating plate.

The present invention provides a motorcycle including an exhaust system extending rearward from an engine mounted on a body frame. A fuel tank is mounted on the body frame above the engine. A seat is mounted on the body frame and positioned behind the fuel tank. The exhaust system has a bent portion that extends upward from a position below the seat toward the seat and is then bent downward. A heat insulating plate is disposed in a space between the bent portion and the seat so as to cover the bent portion.

In the motorcycle according to the present invention, because the exhaust system has a bent portion that extends upward from a position below the seat toward the seat and is then bent downward, the exhaust pipe is lengthened by the length of the bent portion and a required length of exhaust pipe is ensured.

Furthermore, the heat insulating plate is disposed in the space between the bent portion and the seat so as to cover the bent portion. Accordingly, heat transfer from the bent portion, at which the exhaust pipe is closest to the seat and therefore in a thermally harsh condition, to the seat is blocked while the heat insulating plate is downsized, thereby avoiding additional cost and weight.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
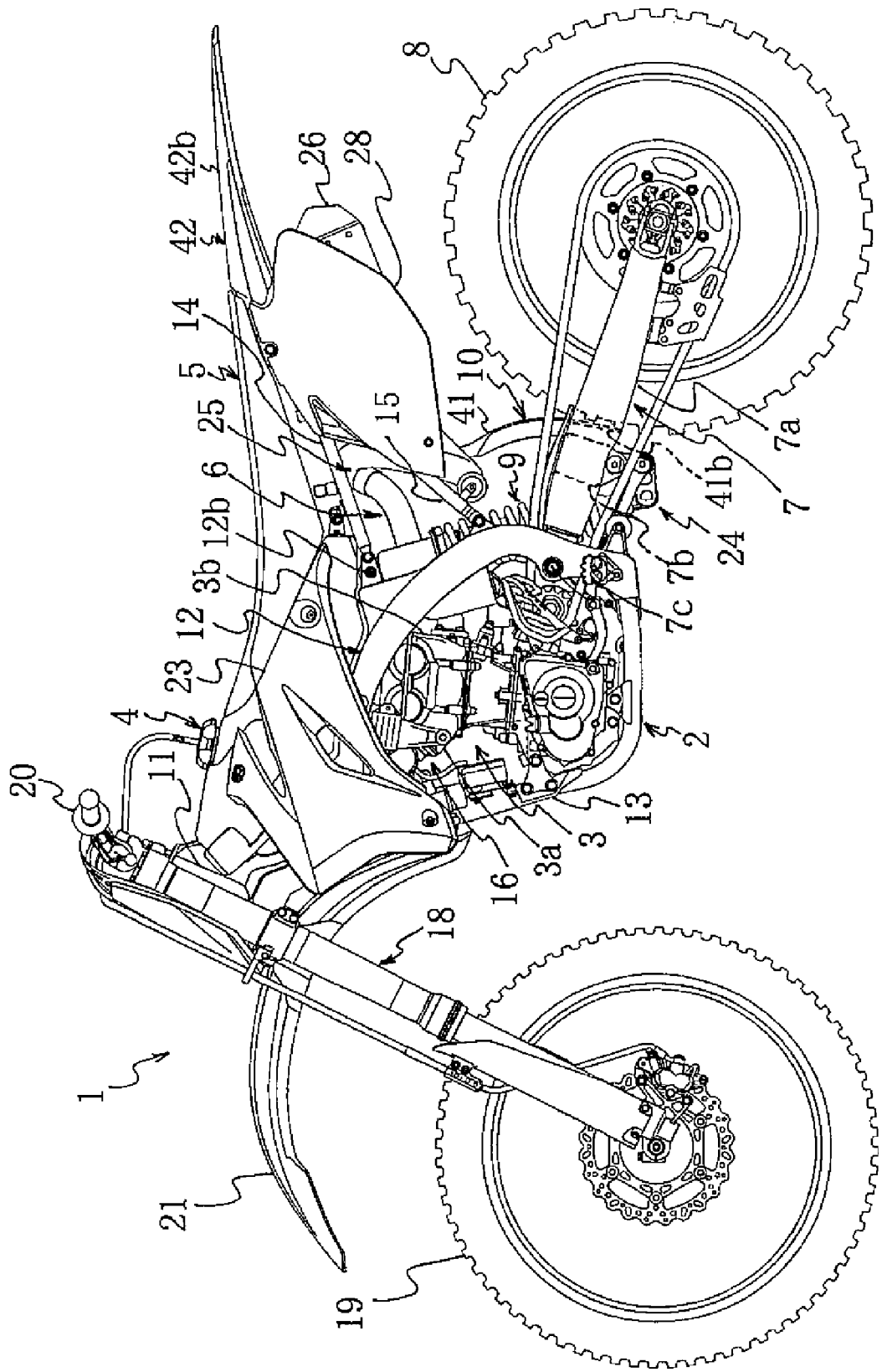
FIG. 1 is a side view of a motorcycle according to an embodiment of the present invention.

Embodiments of the present invention are now described with reference to the drawings. FIGS. 1-9 depict a motorcycle 1 according to an embodiment of the invention. In the following description, directional terms such as front and rear, left and right, and so on are from a seated rider's perspective unless otherwise specified.

Motorcycle 1 is an off-road motorcycle including an engine 3 mounted on a body frame 2, a fuel tank 4 mounted on body frame 2 above engine 3 and a straddle-type seat 5 mounted on body frame 2 and positioned behind fuel tank 4.

Motorcycle 1 also includes an intake system 16 extending forward from engine 3, an exhaust system 6 extending rearward from engine 3, a swing arm 7 vertically pivotally supported by body frame 2, a rear wheel 8 supported by the rear end of swing arm 7, a rear cushion 9 interposed between swing arm 7 and body frame 2, and a mudguard 10 disposed among rear wheel 8, rear cushion 9 and seat 5.

Body frame 2 includes a head pipe 11 provided at the front end of body frame 2, left and right main frames 12, 12 extending obliquely downwardly and rearwardly from head pipe 11, a down tube 13 extending downward from head pipe 11, left and right seat rails 14, 14 extending obliquely upwardly and forwardly from bosses 12a formed on upper rear portions of main frames 12, and left and right seat stays 15, 15, for coupling seat rails 14 to main frames 12.

Head pipe 11 supports a front fork 18 to be steerable to the left and right. Front fork 18 pivotally supports, at a lower end thereof, a front wheel 19. Steering handlebars 20 are attached to an upper end of front fork 18. A front fender 21 for covering front wheel 19 from above is also attached to front fork 18.

Left and right side covers 23 are attached to outer sides of left and right main frames 12 in a vehicle width direction to cover fuel tank 4.

Swing arm 7 includes left and right arm bodies 7a, 7a extending in a fore-and-aft direction and a cross member 7b connecting front portions of arm bodies 7a. Arm bodies 7a are supported at front ends thereof by lower ends of main frames 12 via a pivot shaft 7c.

Rear cushion 9 absorbs vertical shocks transmitted to rear wheel 8 from a road surface and is disposed behind engine 3, in a vehicle-widthwise center portion, with its axis tilted slightly forward. A lower portion of rear cushion 9 extends vertically through a space defined by left and right arm bodies 7a, cross member 7b and pivot shaft 7c.

Rear cushion 9 is coupled at an upper end thereof to a support shaft 12b. Support shaft 12b extends through bosses 12a, 12a of left and right main frames 12 in the vehicle width direction. Rear cushion 9 is coupled at a lower end thereof to cross member 7b via a link mechanism 24.

Engine 3 is a water-cooled, 4-cycle, single cylinder engine, and is mounted on body frame 2 with a cylinder axis thereof extending generally vertically.

An intake pipe 16a of intake system 16 is connected to and linearly extends obliquely forward from an intake port defined in front wall 3a of engine 3. An air cleaner is connected to the upstream end of intake pipe 16a.

The air cleaner is positioned between main frames 12 below fuel tank 4 and covered by side covers 23. A throttle body that incorporates a throttle valve is inserted in intake pipe 16a, and a fuel injection valve is disposed in intake pipe 16a downstream from the throttle body.

Exhaust system 6 has, on a rear wall 3b of engine 3, an exhaust pipe 25 connected to an exhaust port into communication therewith and a muffler 26 connected to the downstream end of exhaust pipe 25. Muffler 26 is positioned below a vehicle-widthwise right one of seat rails 14 and hung therefrom. Left and right rear side covers 28, 28 are attached to vehicle-widthwise outer sides of left and right seat rails 14, respectively, to cover muffler 26.

Exhaust pipe 25 extends from rear wall 3b of engine 3 obliquely rearwardly on the right of rear cushion 9, and then is bent into a looped shape in a space between rear cushion 9 and rear wheel 8. The structure of exhaust pipe 25 is described below in detail.

Exhaust pipe 25 has a first exhaust pipe portion 25a, an upper exhaust pipe portion 25b, a second exhaust pipe portion 25c, a lower exhaust pipe portion 25d, and a third exhaust pipe portion 25e. First exhaust pipe portion 25a extends from rear wall 3b of engine 3 obliquely rearwardly and upwardly in a space between the vehicle-widthwise right one of main frames 12 and rear cushion 9 in a rising manner. Upper exhaust pipe portion 25b having the shape of an upturned arc extends below a bottom plate 5a of seat 5 from an upper portion of first exhaust pipe portion 25a while being leftwardly bent in the vehicle widthwise direction. Second exhaust pipe portion 25c arcuately extends downward from a left portion of upper exhaust pipe portion 25b therebelow. Lower exhaust pipe portion 25d having the shape of a downturned arc extends from a lower portion of second exhaust pipe portion 25c while being rightwardly bent in the vehicle width direction. Third exhaust pipe portion 25e extends from a right portion of lower exhaust pipe portion 25d obliquely upwardly and rearwardly. Muffler 26 is connected to the downstream end of third exhaust pipe portion 25e.

As viewed from the rear of the vehicle, first exhaust pipe portion 25a extends vertically on the right side of exhaust pipe 25 in the vehicle width direction and second exhaust pipe portion 25c extends vertically on the left side of the same in the vehicle width direction.

Upper exhaust pipe portion 25b extends in the vehicle width direction to connect the upper portions of first exhaust pipe portion 25a and second exhaust pipe portion 25c therebetween and is positioned highest in exhaust pipe 25. Lower exhaust pipe portion 25d extends in the vehicle width direction to connect lower portions of first exhaust pipe portion 25a and second exhaust pipe portion 25c. Lower exhaust pipe portion 25d is positioned lowest in exhaust pipe 25.

Figure 8:
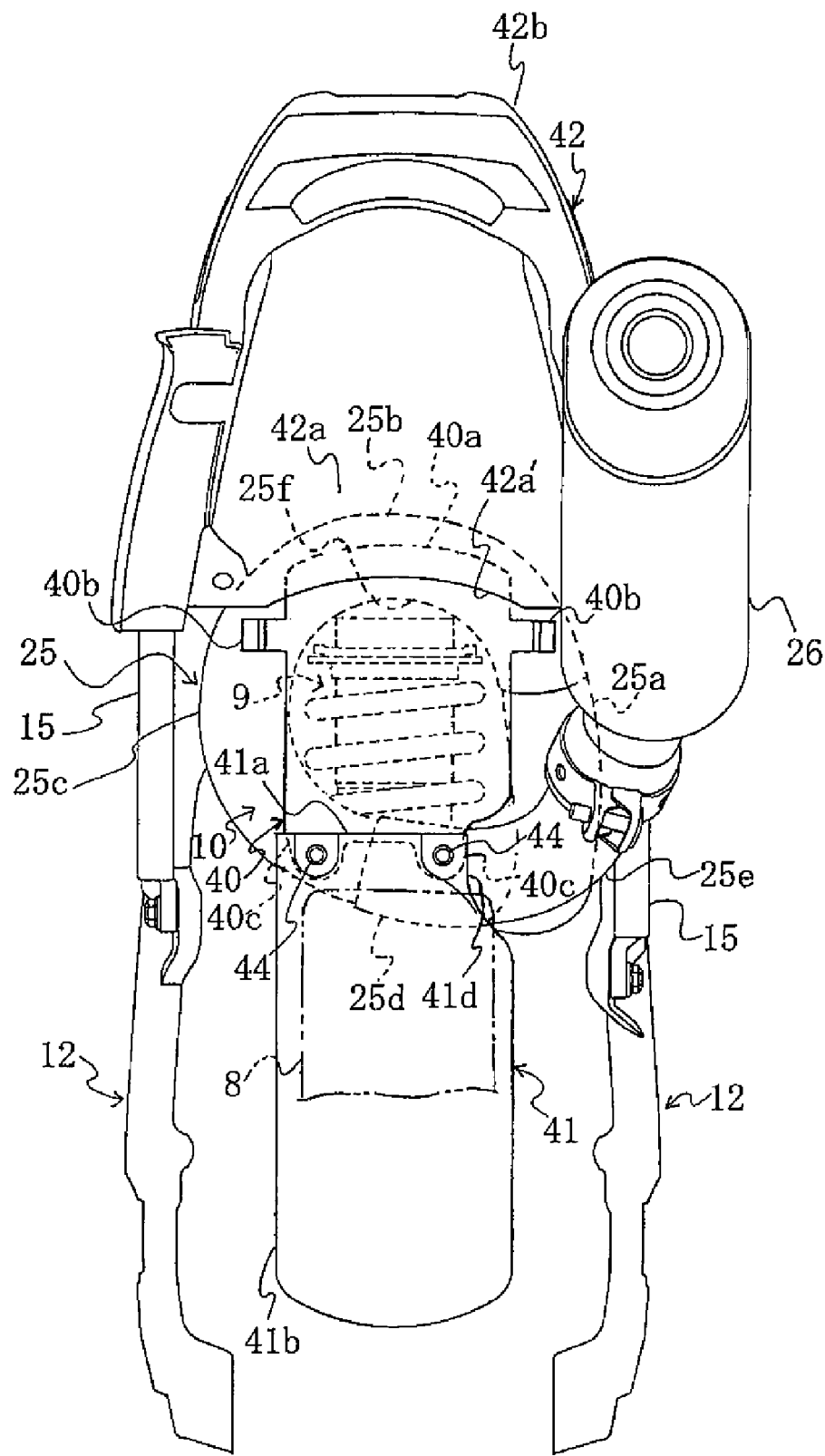
FIG. 8 is a rear view of the mudguard.
Figure 9:
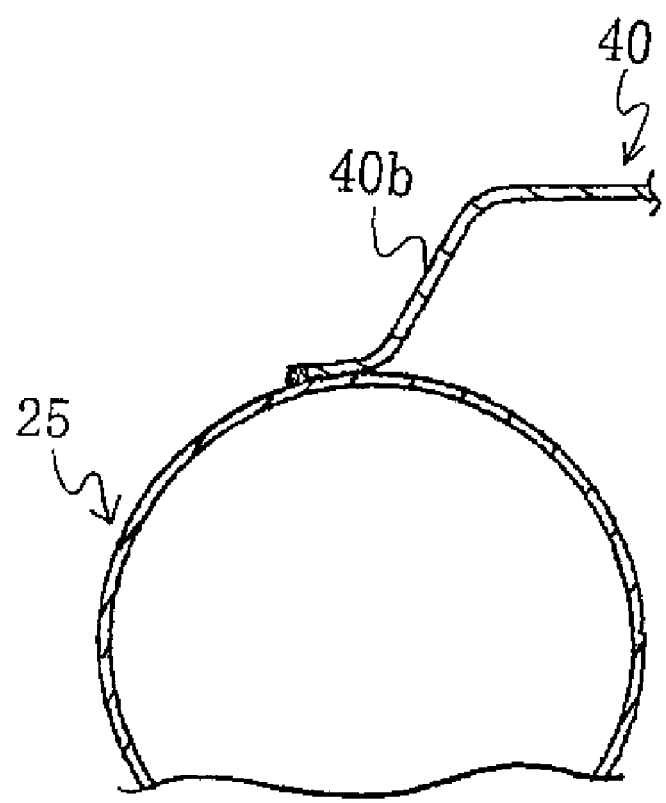
FIG. 9 is a cross-sectional view of a guard of the mudguard.

As described above, exhaust pipe 25 extends generally in the shape of a circular loop in a space between left and right seat rails 14 and between left and right seat stays 15 when viewed from the rear of the vehicle. An upper portion of rear cushion 9 is positioned inside a circular opening 25f provided by the circular shape of exhaust pipe 25 when viewed from the rear of the vehicle (FIG. 8).

Figure 2:
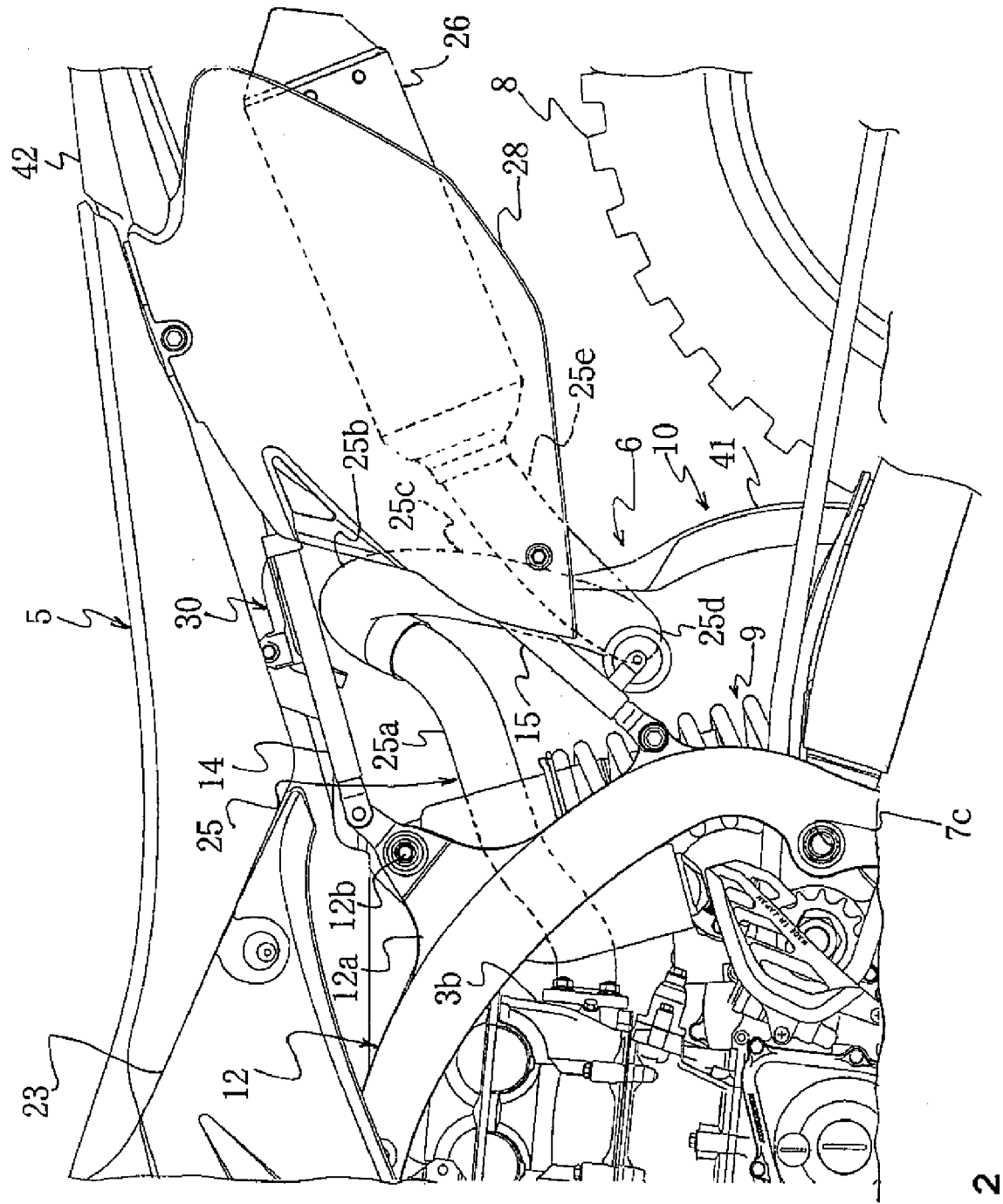
FIG. 2 is a side view of an exhaust system of the motorcycle.
Figure 3:
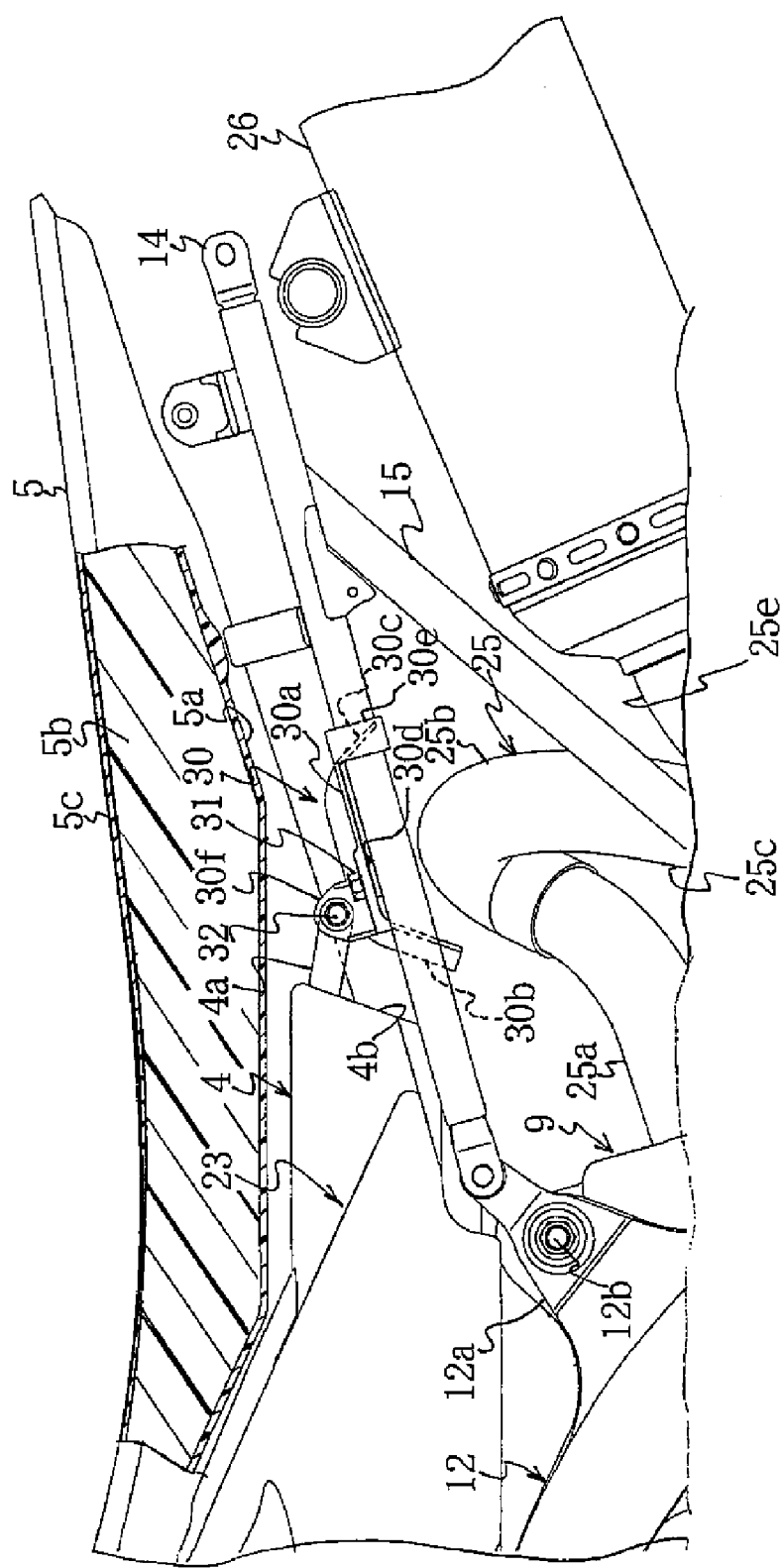
FIG. 3 is a side view of a heat insulating plate disposed in the exhaust system.
Figure 4:
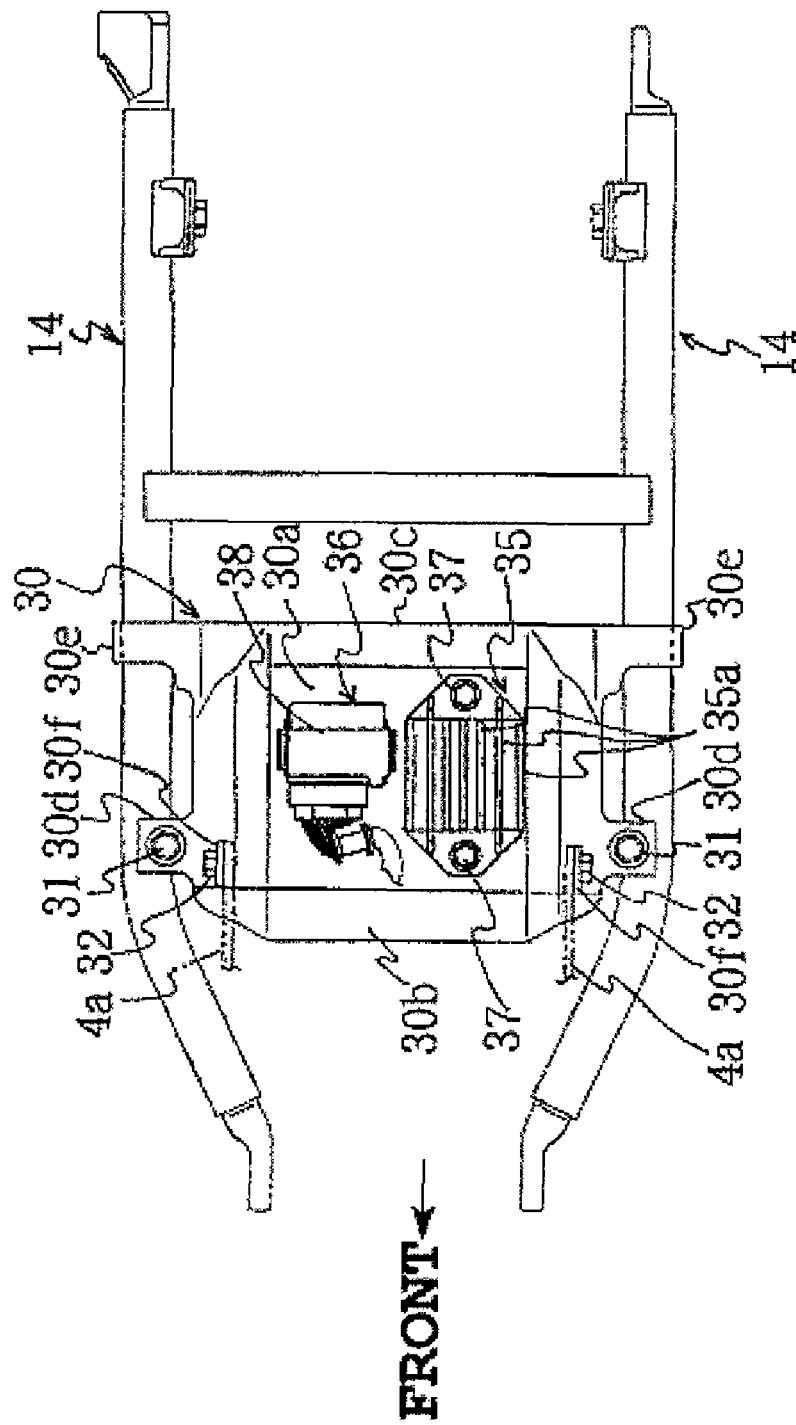
FIG. 4 is a plan view of the heat insulating plate.
Figure 5:
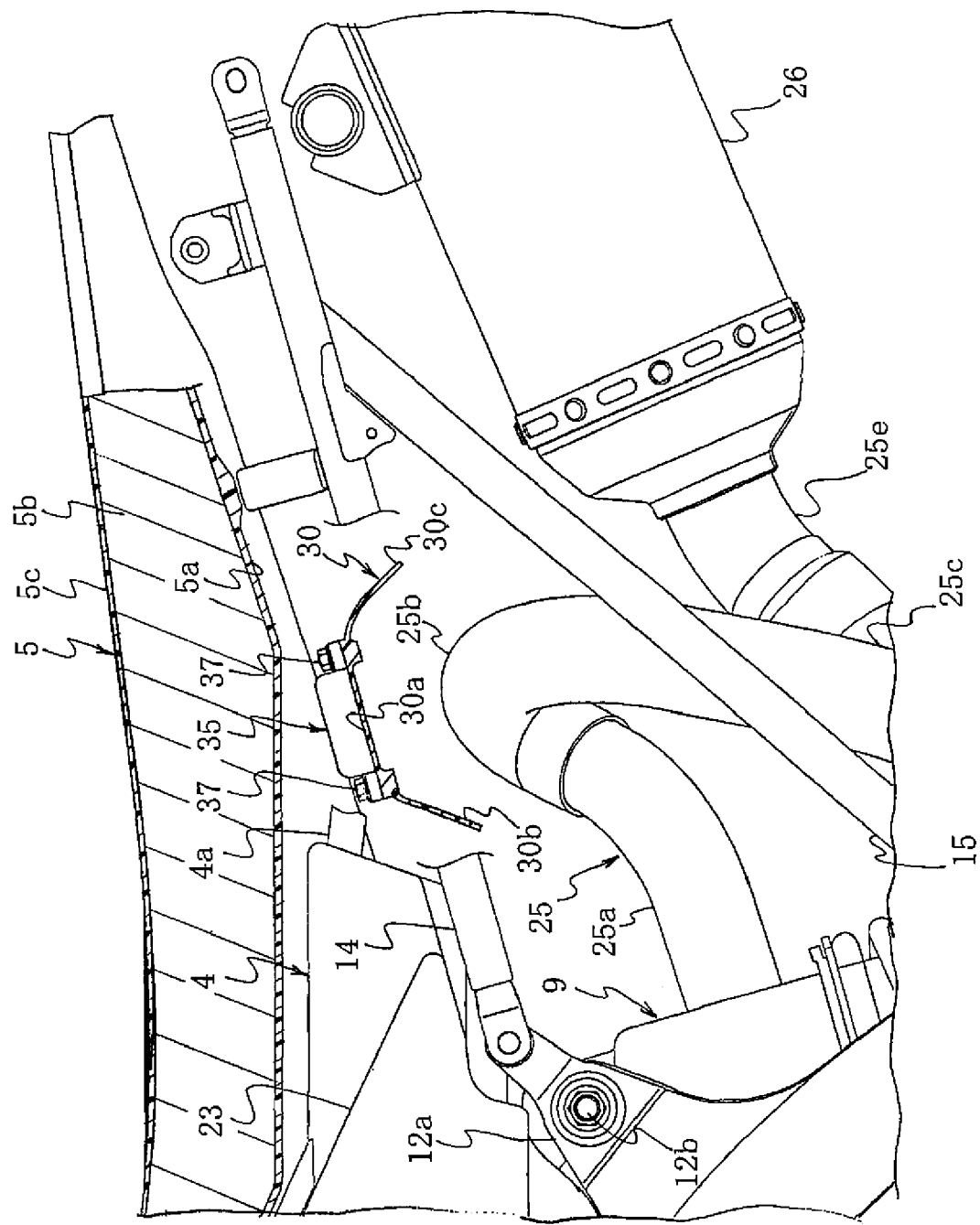
FIG. 5 is a side view of the heat insulating plate.

Exhaust pipe 25 makes generally one revolution from front to back in the space between rear cushion 9 and rear wheel 8 in a left side view of the vehicle (FIG. 2). The required length of exhaust pipe 25 is ensured as described above.

Figure 6:
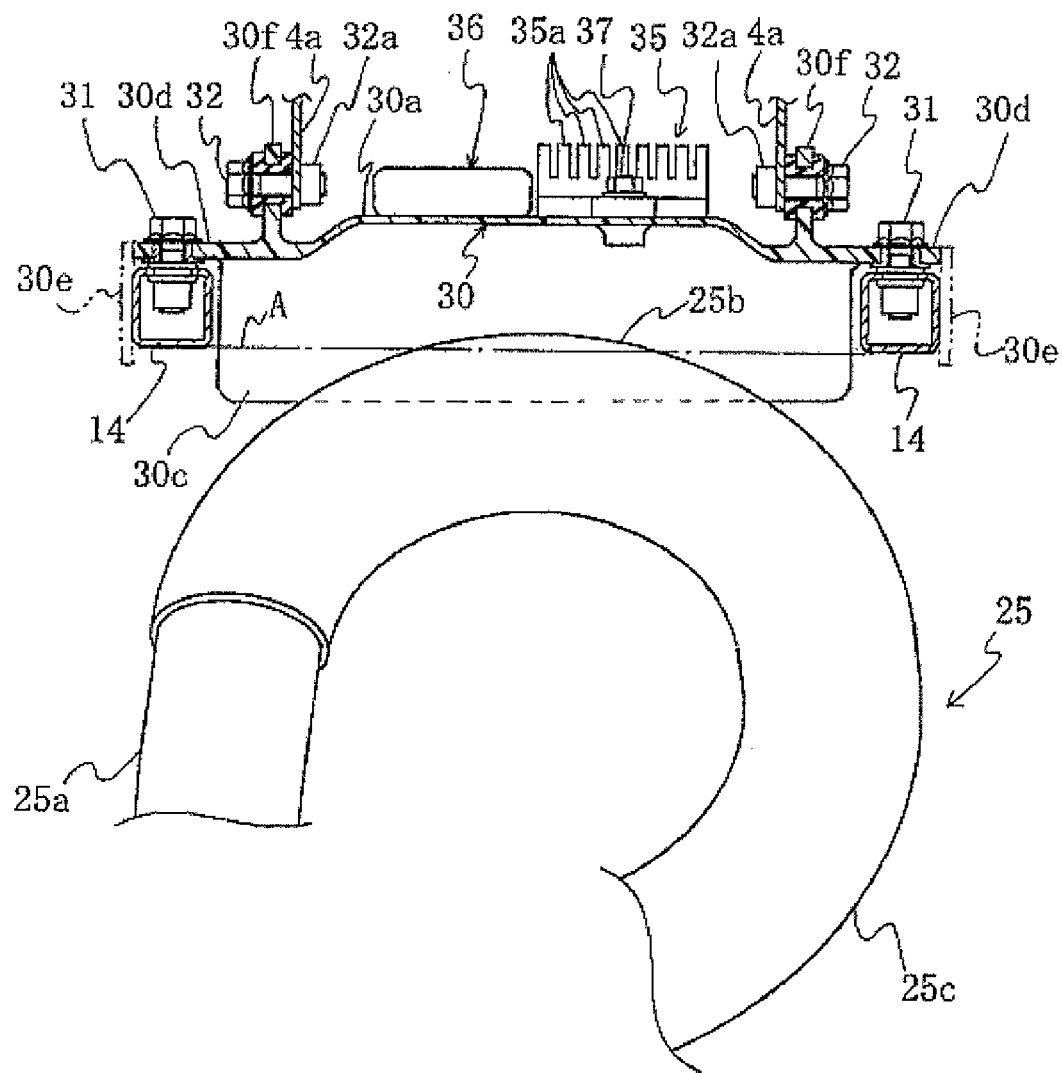
FIG. 6 is a cross-sectional front view of the heat insulating plate.

An upper edge of upper exhaust pipe portion 25b is positioned at substantially the same height as line A drawn to connect bottom surfaces of seat rails 14 (FIG. 6). Upper exhaust pipe portion 25b generally forms an upwardly-projecting bent portion and is in the proximity of the bottom surface of bottom plate 5a of seat 5. Seat 5 comprises a resin seat cushion 5b fixed on a resin seat bottom plate 5a with an adhesive and wrapped in a resin outer skin 5c. Lower exhaust pipe portion 25d is positioned at substantially the same height as the vicinities of front ends of seat stays 15.

A heat insulating plate 30 is disposed in a space between upper exhaust pipe portion 25b and seat bottom plate 5a to cover upper exhaust pipe portion 25b from above. Heat insulating plate 30 is made of a heat-resistant resin and has a planer main plate portion 30a extending generally along seat bottom plate 5a, a front wall portion 30b that is downwardly bent to continuously extend from a front edge of main plate portion 30a, and a rear wall portion 30c that is downwardly bent to continuously extend from a rear edge of main plate portion 30a. Heat insulating plate 30 may be a metal plate.

Front wall portion 30b extends to be positioned between upper exhaust pipe portion 25b and fuel tank 4. Main plate portion 30a, front wall portion 30b and rear wall portion 30c cover upper exhaust pipe portion 25b from above, obliquely forward, and obliquely rearward.

Heat insulating plate 30 spans across and is attached to seat rails 14, which are positioned below seat 5. More specifically, heat insulating plate 30 has left and right mounts 30d, 30d and left and right positioning-and-engaging portions 30e, 30e. Mounts 30d project outward in the vehicle width direction from left and right front edges of main plate portion 30a. Positioning-and-engaging portions 30e project outward in the vehicle width direction from left and right rear edges of main plate portion 30a and further bend downward. Positioning-and-engaging portions 30e are engaged with outer side surfaces of seat rails 14, thereby positioning heat insulating plate 30 in the vehicle width direction. Heat insulating plate 30 is detachably attached to seat rails 14 by securing mounts 30d onto upper surfaces of seat rails 14 with bolts 31.

Mounts 30d and positioning-and-engaging portions 30e are stepped down from main plate 30a. Accordingly, main plate portion 30a is slightly higher than the upper surfaces of seat rails 14. Seat rails 14 serve as side walls extending downward from left and right edges of main plate portion 30a. As a result, when viewed from the top of the vehicle, upper exhaust pipe portion 25b is positioned inside a space surrounded by seat rails 14, main plate portion 30a, front wall portion 30b, and rear wall portion 30c.

Support bosses 30f, 30f project upward from main plate portion 30a at vehicle-widthwise inner positions relative to left and right mounts 30d of main plate portion 30a. Left and right flanges 4a, 4a project rearward from a rear wall 4b of fuel tank 4. A nut 32a is secured to an inner surface of each of flanges 4a. Flanges 4a are fixed to support bosses 30f with nuts 32a and bolts 32 inserted thereinto from outer sides in the vehicle width direction.

Electrical components such as a regulator 35, an ECU 36 and the like are disposed in parallel in the vehicle width direction on the top surface of main plate portion 30a of heat insulating plate 30. Regulator 35 is detachably attached to main plate portion 30a with front and rear bolts 37, 37. Regulator 35 includes a large number of cooling fins 35a formed at regular intervals in the vehicle width direction. ECU 36 controls fuel injection timing, injection quantity, ignition timing and the like of the fuel injection valve corresponding to an operating state of engine 3. ECU 36 is detachably attached to main plate portion 30a with a rubber band 38.

Mudguard 10 includes a first guard 40 positioned in a space between rear wheel 8 and the looped portion of exhaust pipe 25, a second guard 41 positioned below first guard 40, a rear fender 42 positioned above rear wheel 8, and a further portion of exhaust pipe 25.

Figure 7:
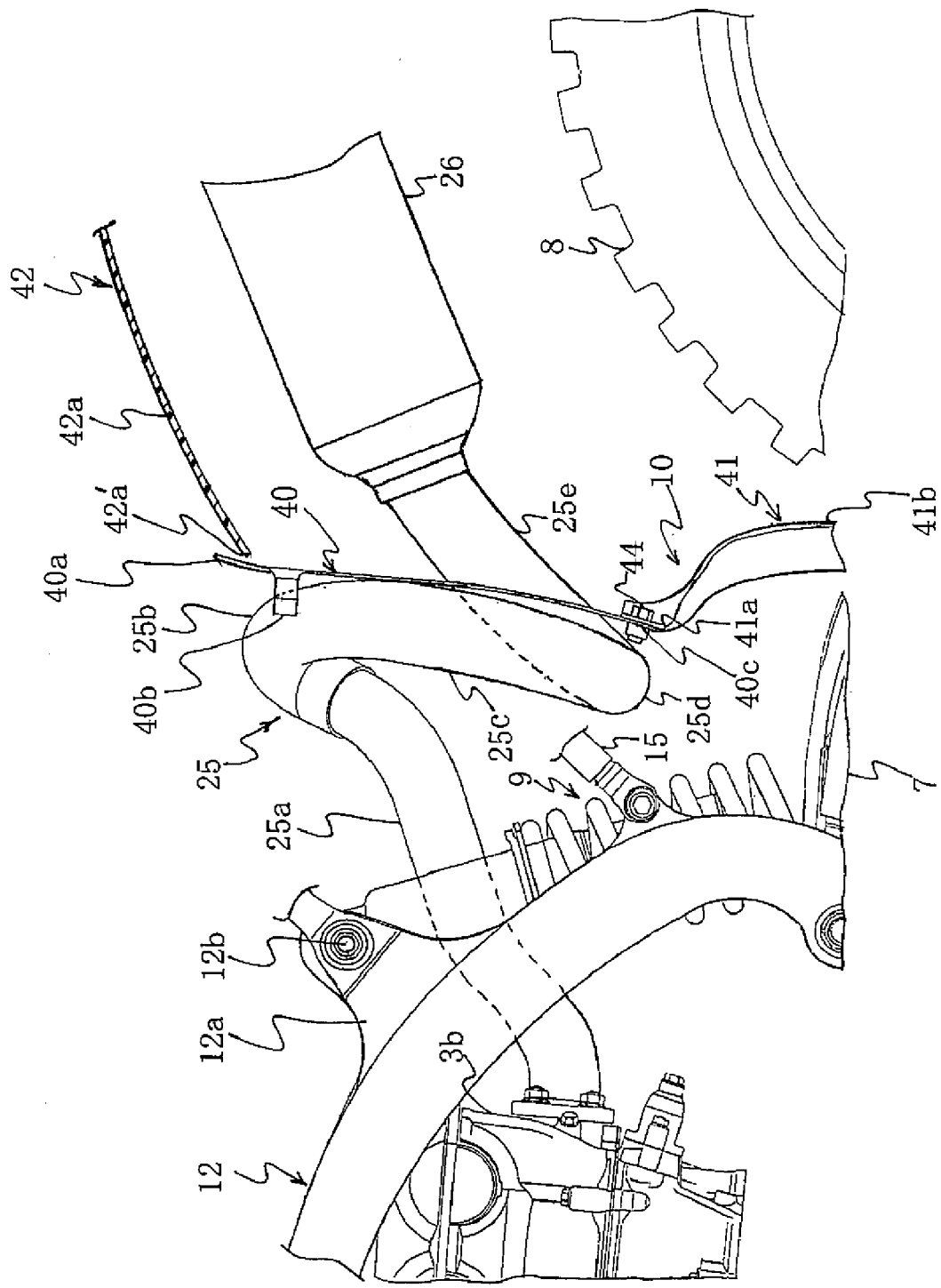
FIG. 7 is a side view of a mudguard disposed in the exhaust system.

Rear fender 42 is made of resin and extends in the fore-and-aft direction to cover a space below seat 5 and between seat rails 14, and is attached to seat rails 14. A front end 42a of rear fender 42 is positioned in the vicinity of a front edge of muffler 26. A rear end 42b of rear fender 42 extends rearward from a rear edge of seat 5 to form a surface continuing therefrom (FIGS. 1 and 7).

First guard 40 is made up of a metal plate of aluminum or stainless steel. Second guard 41 is made up of a resin or metal plate. First guard 40 is attached to exhaust pipe 25 at a position between rear cushion 9 and rear wheel 8. The structure of first guard 40 is described below in detail.

First guard 40 is disposed in front of a front edge 42a' of rear fender 42. An upper edge 40a of first guard 40 overlaps front edge 42a' of rear fender 42 when viewed from the rear of the vehicle. First guard 40 seals circular opening 25f defined by first exhaust pipe portion 25a, second exhaust pipe portion 25c, upper exhaust pipe portion 25b and lower exhaust pipe portion 25d when viewed from the rear of the vehicle. First guard 40 further covers rear cushion 9 from behind (FIG. 8).

Outer peripheries of first exhaust pipe portion 25a, upper exhaust pipe portion 25b, second exhaust pipe portion 25c and lower exhaust pipe portion 25d are positioned outside of an outer periphery of first guard 40. Hence, exhaust pipe portions 25a-25d also function as mudguards for preventing mud splashed by rear wheel 8 from sticking to rear cushion 9.

Leg portions 40b, 40b are bent forward from left and right upper edges of first guard 40. Leg portions 40b are fixed by welding to the vicinities of boundaries between upper exhaust pipe portion 25b, and first and second exhaust pipe portions 25a and 25c, respectively. First guard 40 is fixed by welding to upper exhaust pipe portion 25b in advance during a subassembly process of exhaust system 6.

Left and right installation seats 40c, 40c project downward from a lower edge of first guard 40. An upper edge 41a of second guard 41 is detachably attached to installation seats 40c with bolts 44.

Second guard 41 extends downward from first guard 40 so as to be positioned in the space between rear wheel 8 and rear cushion 9. A lower end 41b of second guard 41 is positioned between cross member 7b of swing arm 7 and rear wheel 8. A relief recess 41d for preventing second guard 41 from interfering with third exhaust pipe portion 25e is defined in a right upper corner of second guard 41.

Motorcycle 1 according to this embodiment adopts a front intake, rear exhaust layout having intake system 16 extending forward from front wall 3a of engine 3 and exhaust system 6 extending rearward from rear wall 3b of engine 3. This allows formation of intake pipe 16a for supplying air to engine 3 into a straight line, thereby cutting down intake resistance. In addition, because the air cleaner is positioned in front of engine 3, running air is supplied to the engine without undergoing influence of combustion heat of engine 3 and the like, thereby increasing charging efficiency.

Furthermore, exhaust pipe 25 of exhaust system 6 extends straight and rearward from rear wall 3b of engine 3. A simplified external appearance as compared with a structure in which exhaust pipe 25 extends along a side of the engine is thereby provided, and the influence of exhaust heat exerted on the legs of a rider is decreased. A portion of exhaust pipe 25 extends like a loop by utilizing the free space between rear cushion 9 and rear wheel 8 to form a bent portion and to ensure the required length of the exhaust pipe.

When exhaust pipe 25 is bent like a loop below seat 5, upper exhaust pipe portion 25b that forms the bent portion is positioned in the vicinity of seat 5. In this case, exhaust heat may undesirably exert influence on a rider. According to this embodiment, heat insulating plate 30 covers upper exhaust pipe portion 25b, which extends upward from a position below seat 5 toward seat 5 and is then bent downward. Accordingly, heat transfer from upper exhaust pipe portion 25b, which is under a thermally harsh condition, to seat 5 is blocked or suppressed, thereby eliminating or reducing influence of the exhaust heat on the rider.

Only upper exhaust pipe portion 25b, which is under the thermally harsh condition, is covered with heat insulating plate 30. Accordingly, heat insulating plate 30 is downsized as compared with a conventional structure in which the exhaust pipe is covered throughout its length, thereby reducing additional cost and weight.

According to this embodiment, heat insulating plate 30 has planer main plate portion 30a bent generally along bottom plate 5a of seat 5, and front wall portion 30b and rear wall portion 30c extending downward from the front edge and the rear edge of main plate portion 30a, respectively. Accordingly, heat insulating plate 30 covers and surrounds upper exhaust pipe portion 25b from above, obliquely forward, and obliquely rearward, thereby reliably preventing transfer of exhaust heat to seat 5.

In addition, because front wall portion 30b is positioned between upper exhaust pipe portion 25b and fuel tank 4, exhaust heat is less easily transferred to fuel tank 4.

According to this embodiment, heat insulating plate 30 spans left and right seat rails 14 and is attached thereto. Hence, heat insulating plate 30 is securely mounted by making use of seat rails 14.

According to this embodiment, heat insulating plate 30 is disposed above the upper surfaces of seat rails 14. Seat rails 14 thereby function as side walls of heat insulating plate 30 extending downward from left and right edges of heat insulating plate 30, more reliably protecting seat 5 from heat transfer of exhaust heat.

Left and right support bosses 30f are formed on heat insulating plate 30, and left and right flanges 4a provided on fuel tank 4 are fastened to support bosses 30f with bolts. Heat insulating plate 30 thus also functions as a fixing element of fuel tank 4, thereby reducing the number of parts and cost.

According to this embodiment, electrical components such as regulator 35, ECU 36 and the like are mounted on the top surface of heat insulating plate 30. Hence, the electrical components can be concentrated on heat insulating plate 30, thereby allowing wire harnesses and the like to be reduced in length.

An embodiment of a motorcycle employing a front intake, rear exhaust layout has been described, in which intake system 6 extends forward from front wall 3a of engine 3 and exhaust system 6 extends rearward from rear wall 3b. However, the present invention can be applied to motorcycles of other layouts, such as a rear intake, front exhaust layout. In this case, an exhaust pipe extends forward from an engine, passes by or below the engine to extend rearward, extends further upward from a position below a seat toward the seat, and then extends downward to form a bent portion. The bent portion is covered with a heat insulating plate.

The invention claimed is:

1. A motorcycle comprising:
an exhaust system extending rearward from an engine mounted on a body frame, the exhaust system defined by a longitudinally extending length of exhaust pipe;
a fuel tank mounted on the body frame above the engine; and
a seat mounted on the body frame to be positioned behind the fuel tank, wherein the exhaust system includes a first portion that extends upward from a position below the seat toward the seat, an upper portion that extends from the first portion and longitudinally in a widthwise direction of the motorcycle, and a second portion that extends downward from the upper portion; and
a heat insulating plate is disposed in a space between the upper portion and the seat so as to cover only the upper portion and not the first portion or the second portion of the exhaust system connected to the upper portion.

2. The motorcycle according to claim 1, wherein the heat insulating plate includes:
a main plate portion bending generally along a bottom plate of the seat;
a front wall portion extending downward from a front edge of the main plate portion; and
a rear wall portion bending downward from a rear edge of the main plate portion.

3. The motorcycle according to claim 2, wherein a part of the front wall portion is positioned between the upper portion of the exhaust system and the fuel tank.

4. The motorcycle according to claim 1, wherein the body frame includes left and right seat rails supporting the seat; and the heat insulating plate spans the seat rails and is attached thereto.

5. The motorcycle according to claim 4, wherein the heat insulating plate is disposed above the seat rails.

6. The motorcycle according to claim 1, wherein the heat insulating plate includes a support boss, to which a flange formed on the fuel tank is attached.

7. The motorcycle according to claim 1, wherein an electronic component is mounted on the heat insulating plate.

8. The motorcycle according to claim 1, wherein the heat insulating plate is a resin plate.

9. The motorcycle according to claim 1, wherein the heat insulating plate is a metal plate.

10. The motorcycle according to claim 2, wherein the body frame includes left and right seat rails supporting the seat, and the upper portion of the exhaust system is positioned inside a space defined by the main plate portion, the front wall portion, the rear wall portion, and the left and right seat rails.

11. The motorcycle according to claim 2, wherein the heat insulating plate covers the upper portion of the exhaust system from directly above by the main plate portion, from obliquely forward and above by the front wall portion, and from obliquely rearward and above by the rear wall portion.

12. The motorcycle according to claim 1, wherein the body frame includes left and right seat rails supporting the seat, and the exhaust system extends generally in a shape of a circular loop in a space between the left and right seat rails when viewed from a rear of the motorcycle.

13. The motorcycle according to claim 1, wherein the upper portion of the exhaust system extends longitudinally substantially only in the widthwise direction of the motorcycle.

* * * * *